United States Patent [19]

Moser

[11] 4,192,361

[45] Mar. 11, 1980

[54] APPARATUS FOR FILLING CAPSULES AND THE LIKE

[75] Inventor: Theo Moser, Steinenberg, Fed. Rep. of Germany

[73] Assignee: Robert Bosch GmbH, Stuttgart, Fed. Rep. of Germany

[21] Appl. No.: 943,900

[22] Filed: Sep. 19, 1978

[30] Foreign Application Priority Data

Sep. 20, 1977 [DE] Fed. Rep. of Germany ....... 2742248

[51] Int. Cl.[2] .......................... B67C 3/26; G01F 11/38

[52] U.S. Cl. ................................. 141/82; 137/625.18; 141/284; 141/302; 222/318; 222/380; 417/518

[58] Field of Search ................. 141/82, 116, 140, 141, 141/156, 157, 258, 260, 284, 324, 302, 126, 127; 222/318, 109, 146 R, 424, 444, 380, 309; 137/625.18; 417/518

[56] References Cited

U.S. PATENT DOCUMENTS

| | | | |
|---|---|---|---|
| 3,275,102 | 9/1966 | Holzinger et al. | 222/146 R |
| 3,580,302 | 5/1971 | Riesenberg | 141/141 |
| 3,964,731 | 6/1976 | Ernst | 222/318 X |

*Primary Examiner*—Frederick R. Schmidt
*Attorney, Agent, or Firm*—Edwin E. Greigg

[57] ABSTRACT

An apparatus for dispensing liquid or pasty substances to gelatin capsules and the like, in particular for dispensing pharmaceutical products thereto. In order to maintain the substance to be dispensed in relative motion to prevent deleterious thickening, the apparatus includes a reciprocating dispensing control plunger which periodically enters a capsule or container to be filled. If no container is present and no dispensing is to take place, the control plunger retreats into a position wherein a separate metering piston continues to transport the material but returns it to a storage container via a conrol channel in the control plunger.

3 Claims, 2 Drawing Figures

APPARATUS FOR FILLING CAPSULES AND THE LIKE

FIELD OF THE INVENTION

The invention relates to apparatus for placing liquid or paste-like substances, for example pharmaceutical products, and substances containing such products, into hard gelatin capsules or similar containers. More particularly, the apparatus includes a movable plunger, part of which may enter the capsule to be filled and wherein the motions of the plunger open and close appropriate conduits which carry the product to be placed in the containers.

BACKGROUND OF THE INVENTION

Heretofore, hard gelatin capsules were used principally or only to contain powdery or grainy pharmaceutical products. The capsule-filling machinery for the powder substances generally prepares a powder plug which is inserted into one-half of the gelatin capsule. However, the demands of the pharmaceutical industry include the desirability of placing liquids into hard gelatine capsules. This process involves certain difficulties among which are, firstly, that the two-piece capsule is not necessarily fluid-tight and, secondly, that if the lower capsule half is filled with liquid, that liquid will spill over during a further transporting of the capsule from the filling station to the closure station. Such spillage might be avoided by filling the capsule only partially. However, a partial filling might have negative consumer response due to the suspicion of having produced a so-called "cheated package". Furthermore, the filling efficiency of such a capsule is reduced, resulting in additional packaging costs. Again, a substantially reduced filling factor would make it impossible to package the dosages required in customary capsule sizes.

In order to overcome the aforementioned difficulties, the pharmaceutical industry has developed a fluid containing the medicinal product which congeals after being placed into one-half of a gelatin capsule. The fact that the fluid is capable of congealing makes certain demands on the filling pump, for example the medium must remain fluid during the filling process within the pump and the pump nozzle and must not be permitted to congeal therein.

OBJECT AND SUMMARY OF THE INVENTION

It is thus a principal object of the present invention to provide an apparatus for filling gelatin capsules with a congealable liquid in which the product remains in motion even when no container is present to be filled up. This object is attained according to the invention by a special configuration of the control plunger which permits a metering piston to continue to move normally even though the product itself is not dispensed by the apparatus into a capsule. By maintaining the product in motion, it is kept from congealing which it would do if it were permitted to stand still. It is a further object and advantage of the present invention that the liquidity of the product is insured with relatively simple means which employ a relatively simple construction.

It is a feature of the invention that, when no delivery takes place, the metered-out product is returned to a storage container where it rejoins the stored product for future delivery.

The invention will be better understood as well as further objects and advantages thereof become more apparent from the ensuing detailed description of a preferred embodiment taken in conjunction with the drawing.

DESCRIPTION OF THE PREFERRED EMBODIMENT

Figure 1:
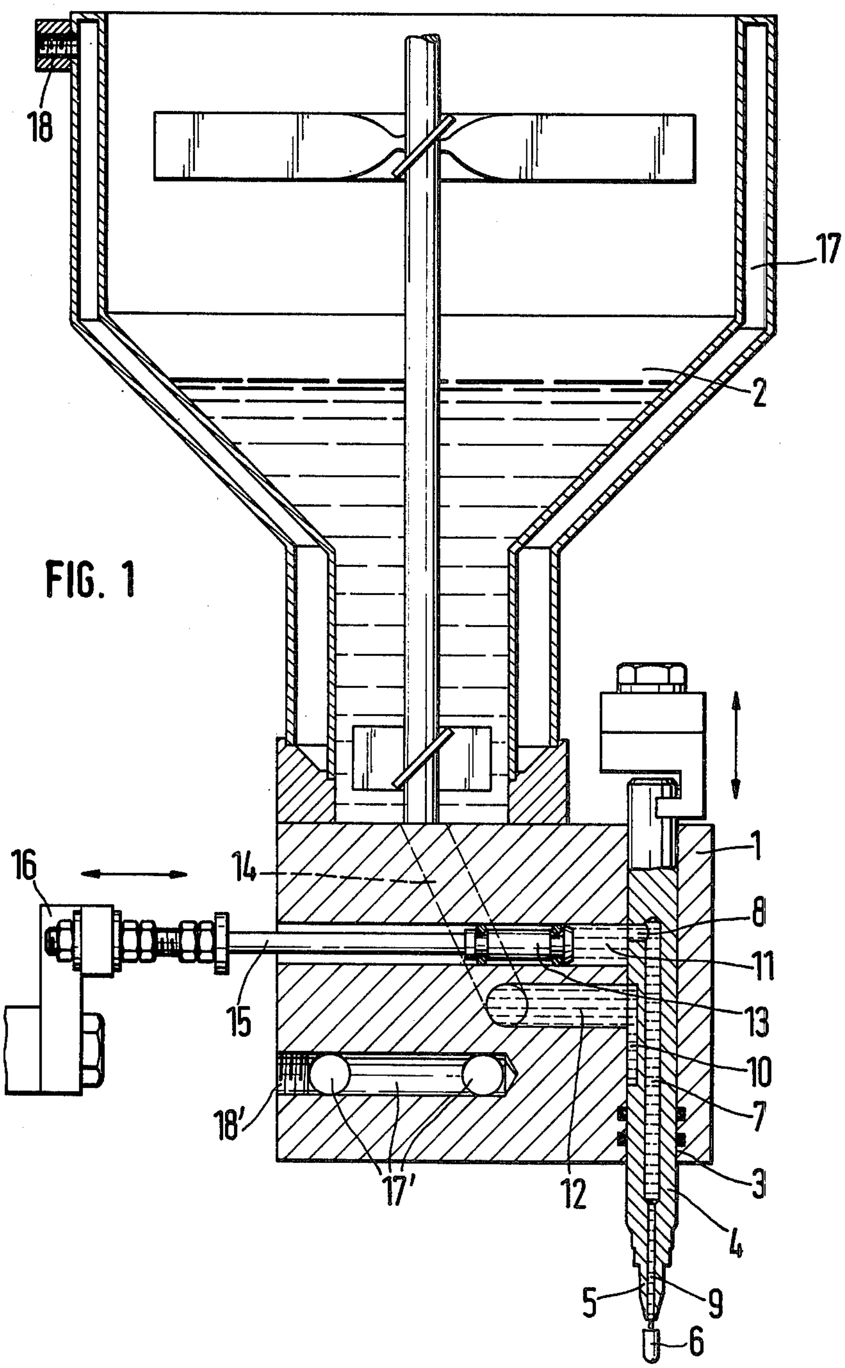
FIG. 1 is a partially sectional front elevational illustration of the apparatus according to the invention in a first configuration.

The relatively simple and straight forward manner of construction of the apparatus will be apparent from a perusal of FIG. 1 in which there is illustrated an apparatus including a housing 1 attached below a storage container 2 into which the product to be dispensed is placed in quantity. The housing 1 has a vertically extending bore 3 in which a control plunger 4 is permitted to move axially, i.e., up and down, in FIG. 1. The extension of the control plunger 4 is a filling nozzle 5 which is intended to enter the lower half 6 of a gelatin capsule etc. to be filled. The control plunger 4 has an axial, i.e., vertical, bore 7 which communicates with a radial bore 8 in the upper bore of the plunger and which continues as a central bore of diminished diameter 9 for delivering the product through the nozzle 5. The control plunger 4 is also provided with a recess 10 at one side thereof.

Figure 2:
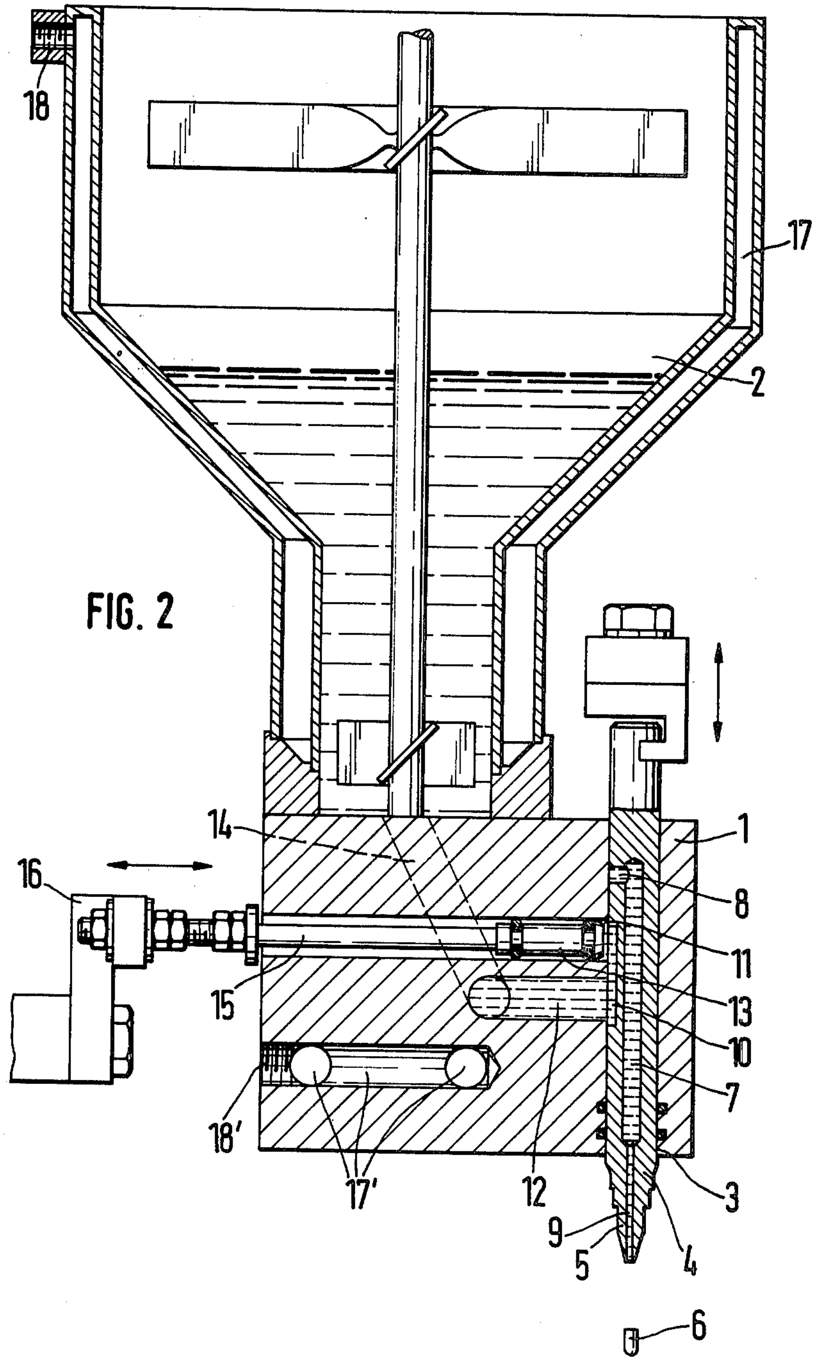
FIG. 2 is an illustration of the apparatus of FIG. 1 in a second configuration.

Extending within the housing are two substantially parallel bores 11 and 12 which may be advantageously disposed one vertically above the other as illustrated and which terminate in and communicate with the vertical bore 3 within the housing 1. Traveling within the bore 11 is a metering piston 13 actuated by a piston rod 15 coupled to a lever 16 which may be driven reciprocatingly by known means, not further shown. The bore 12 communicates through a further bore section 14 with the aforementioned storage container 2. By means not shown in detail, the control plunger 4 may be caused to undergo reciprocating motion, as indicated by the double headed arrow, in a rhythm which is coordinated with the motion of the metering piston 13. The control plunger 4 may thus be caused to occupy two substantially discrete positions, one of which is the position illustrated in FIG. 1. The second position illustrated in FIG. 2 is the position in which the metering piston 13 retracts and admits new product for subsequent dispensing. It is the position illustrated in FIG. 2 which is retained indefinitely if known means, not shown, indicate that no capsule is actually present to receive a dispensed product.

The manner of operation of the dispensing apparatus described above is as follows. When the control plunger 4 assumes the position indicated in FIG. 1, the piston 13, moving to the right as shown in the figure, dispenses a definite amount of product through the bores 8, 7 and 9 and the product flows from the tip of the nozzle 5 into the bottom half of a gelatin capsule 6. When the dispensing is complete, the control plunger 4 moves upwardly into the position illustrated in FIG. 2. At some point during its upward motion, the plunger establishes a communication between the bores 11 and 12 via the recess 10 so that the liquid may now pass from the storage container 2 into the bore 11 when the metering piston 13 is retracted to the left as illustrated in FIG. 2. However, if for whatever reason, no new empty capsule 6 is placed in the correct position, known sensor means, not further illustrated, cause the control plunger 4 to remain in the position illustrated in FIG. 2, as already mentioned. However, it is a distinctive feature of the invention that the metering piston 13 continues its normal motion which is, after retraction to the left, to return to the right as illustrated in FIG. 2, and thus to force material which would normally be dispensed by the plunger to be returned via bores 12 and 14 to the bottom of the storage container 2. Accordingly, the driving mechanism of the metering piston 13 is unaffected by the situation which causes the control plunger 4 to be retained in its position due to the absence of a capsule 6 to be filled and the metering piston thus continues to execute its normal reciprocating motion. A distinct advantage is derived from the fact that the liquid is kept in motion even when not being dispensed so that such products as would tend to thicken or congeal if stationary, actually remain fluid.

It has been found to be advantageous to surround the storage container 2 with a hollow space 17 and to further provide hollow volumes 17' within the housing 1. The hollow spaces 17 and 17' may be coupled via connections 18, 18' to one another or, individually, to means which admit a heating or cooling medium, for example via hoses or the like. By controlling the temperature of the product, its fluidity may be positively enhanced.

The foregoing relates to a preferred exemplary embodiment of the invention, it being understood that variants and other embodiments of the invention are possible within its scope.

What is claimed and desired to be secured by Letters Patent of the United States is:

1. A dispensing apparatus for dispensing liquid, pasty or similar substances such as substances containing medicaments into hard gelatin capsules or the like comprising in combination, a housing having a vertically extending bore, a control plunger including a filling nozzle arranged for reciprocating axial movement between a filling position wherein said filling nozzle extends into a capsule to be filled and a non-filling position, said housing having a pair of horizontally extending bores disposed one above the other in perpendicular relationship with said vertically extending bore and in communication therewith, the outer surface of said plunger being provided with a circumferentially extending recess having a length corresponding to the distance between said pair of horizontally extending bores for selective coupling of said pair of horizontally extending bores in the non-filling position of said control plunger to control the flow of said filling substance into said dispensing apparatus, wherein one of said pair of horizontally extending bores is provided with a reciprocally movable metering piston adapted to draw material through said recess and said other horizontal bore from a supply in the non-filling position of said control plunger, said control plunger being provided with an axially extending bore communicating at one end with the filling nozzle end of said plunger, and a radially extending bore communicating at one end with the other end of said axially extending bore, said radially extending bore being arranged to communicate at its other end with said one horizontally extending bore in said filling position of said control plunger, whereby a metered amount of said material is dispensed from said one horizontal bore by said piston into said radially and axially extending bores out said filling nozzle, in the filling position of said control plunger.

2. A dispensing apparatus in accordance with claim 1 wherein said supply and said housing are provided with hollow spaces for the flow of a heat transfer medium therethrough.

3. A dispensing apparatus in accordance with claim 1 wherein the reciprocating movement of said metering piston is controlled independently of the reciprocating movement of said control plunger.

* * * * *